March 30, 1926.  1,579,014
B. L. MAERTZ
BOTTLE HOLDER
Filed Oct. 28, 1924  2 Sheets-Sheet 1
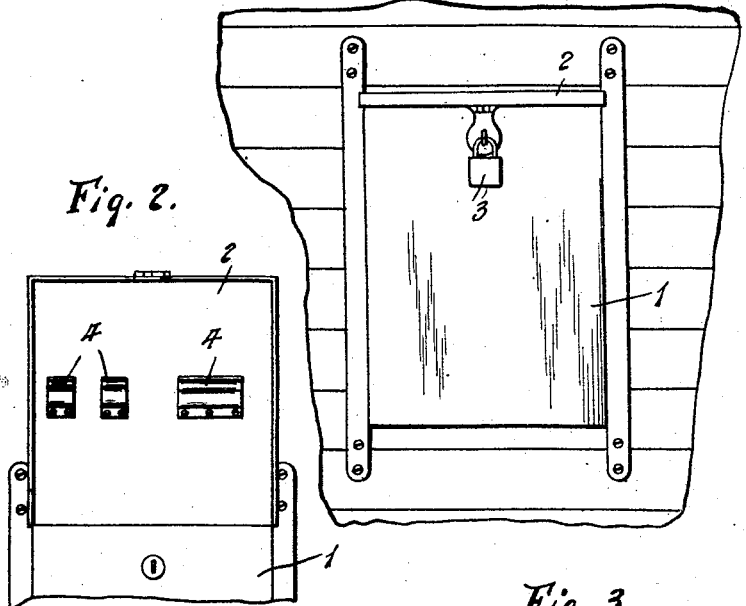
Fig. 1.
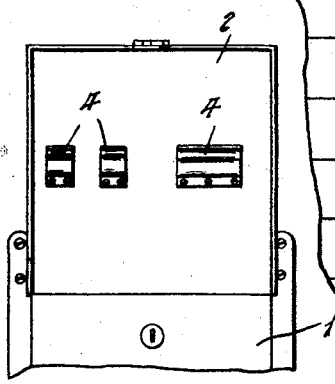
Fig. 2.
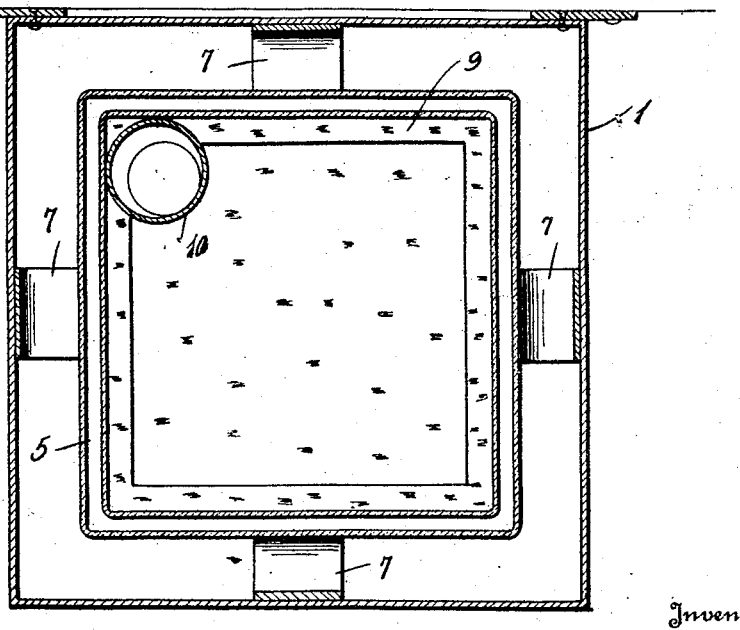
Fig. 3.
Inventor
B. L. Maertz.

March 30, 1926. 1,579,014
B. L. MAERTZ
BOTTLE HOLDER
Filed Oct. 28, 1924 2 Sheets-Sheet 2
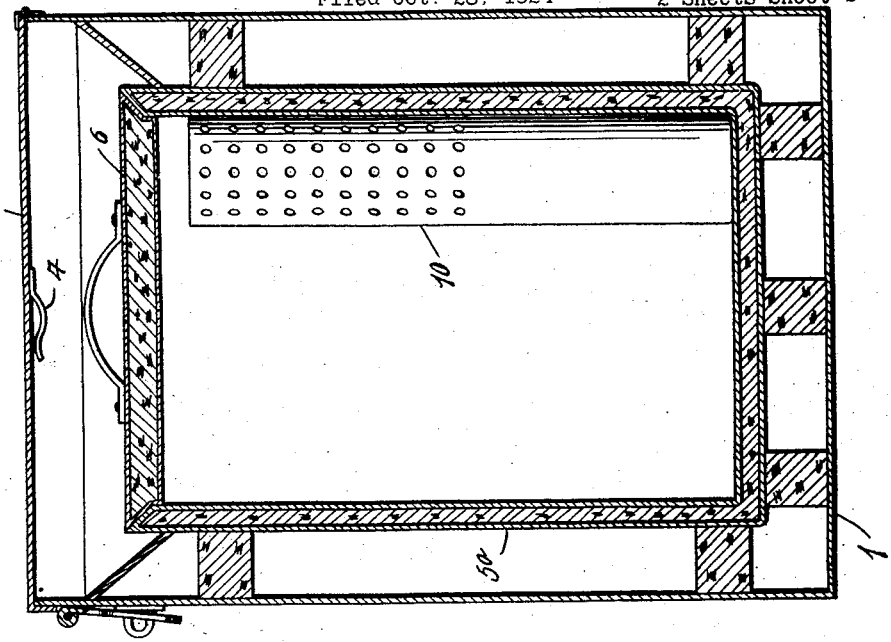
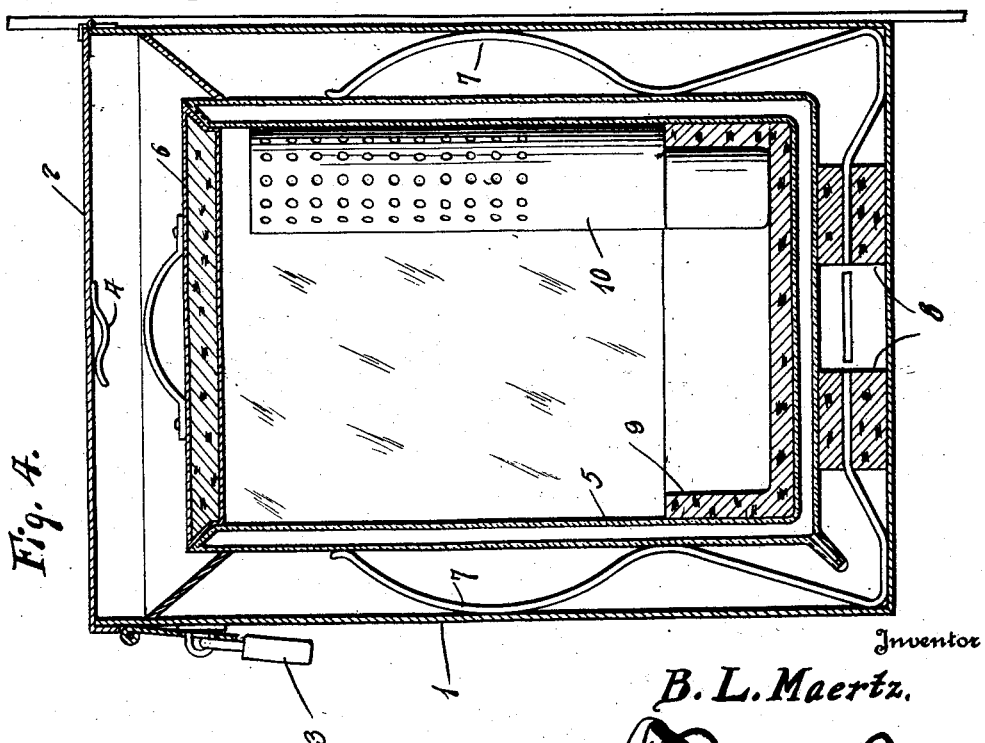
Inventor
B. L. Maertz.
By
Attorney Patented Mar. 30, 1926.

1,579,014

UNITED STATES PATENT OFFICE.

BENJAMIN L. MAERTZ, OF OLIVIA, MINNESOTA.

BOTTLE HOLDER.

Application filed October 28, 1924. Serial No. 746,369.

*To all whom it may concern:*

Be it known that I, BENJAMIN L. MAERTZ, a citizen of the United States, residing at Olivia, in the county of Renville and State of Minnesota, have invented certain new and useful Improvements in Bottle Holders; and I do hereby declare the following to be a full, clear, and exact description of the invention, such as will enable others skilled in the art to which it appertains to make and use the same.

The invention relates to a receptacle adapted for a variety of uses such as a container for the delivery of milk or cream and a refrigerator of a portable nature to be carried upon an automobile when touring or picnicking, said holder protecting milk and cream when delivered and serving to keep food cool in warm weather when enjoying a pleasure trip.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a front view of an article of the nature aforesaid, embodying the invention, showing the same attached to the side of a house, Figure 2 is a front view showing the cover in open position and having a portion of the outer receptacle broken away, Figure 3 is a transverse sectional view, Figure 4 is a vertical view, and Figure 5, is a similar view of a modification.

Corresponding and like parts are referred to in the following description and designated in the several views of the drawings by like reference characters.

The device comprises an outer receptacle 1 which is preferably of metal although it may consist of any desired material and this receptacle is closed at the top by means of a hinged cover 2 which when closed is made secure by means of a lock 3 to which the milk man or other tradesman has a master key to admit of opening the cover to deposit milk or other commodity within the holder. Clips 4 are applied to the inner side of the cover 2 and are adapted to receive a note to the tradesman or tickets for goods delivered. An inner receptacle 5 spaced from the walls of the outer receptacle 1 comprises double walls enclosing a space from which the air is exhausted whereby to provide a vacuum receptacle to keep the contents cool or warm as required.

The inner receptacle 5 is yieldably supported and is closed at the top by means of a removable cover 6 which may consist of metal and cork. Springs 7 are interposed between opposing walls of the inner and outer receptacles and cork blocks 8 are attached to said springs and are preferably disposed between the bottom of the receptacles so as to sustain the weight and any jar incident to impact of the bottom with an object. A lining 9 preferably of cork is applied to the bottom and lower portion of the sides of the inner vacuum receptacle 5 to prevent injury thereto when placing bottles or other analogous articles within the receptacle. An ice holder 10 is located within the inner receptacle and its lower portion is imperforate to retain the water resulting from the melting of the ice and the upper portion is perforated to provide for a circulation of the cool air.

In the construction illustrated in Figure 5, the inner receptacle 5ª may comprise double walls and the space between such walls may be filled with cork or other suitable material generally employed in refrigerators. It is not necessary to provide the springs or yieldable support between the inner and the outer receptacles as said inner receptacle may be held in place in any preferred way.

The holder may be attached to the side of a house in any manner to admit of its ready removal so that it may be carried upon an automobile or other vehicle to receive articles of food to be kept cool and otherwise protected.

What is claimed is:—

1. A holder of the character specified comprising a refrigerator having a food compartment, and an ice receptacle within said compartment, said receptacle being open adjacent the top and in communication with the space of the compartment, the lower portion of the receptacle being imperforate for the purpose specified, a lining within said compartment, said receptacle being located snugly at one corner of the chamber and having the imperforate portion reduced intermediate its ends to provide a shoulder engaging the upper edge of said lining.

2. A holder of the character specified comprising inner and outer receptacles in spaced relation, blocks of insulation within the outer receptacle and on which the bottom of the inner receptacle rests, springs connected to said blocks and extending intermediate the side walls of the receptacle to space and resiliently position them, the inner receptacle constituting a food compartment, and an ice receptacle within the food compartment in communication with the atmosphere thereof, said ice compartment being closed at the bottom.

In testimony whereof I affix my signature.

BENJAMIN L. MAERTZ.